United States Patent
Kwon et al.

(10) Patent No.: US 11,711,828 B2
(45) Date of Patent: Jul. 25, 2023

(54) APPARATUS AND METHODS FOR COMMUNICATION WITH RESPECTIVE COMMUNICATION TYPES

(71) Applicant: NXP USA, INC., Austin, TX (US)

(72) Inventors: Young Hoon Kwon, Laguna Niguel, CA (US); Liwen Chu, San Ramon, CA (US); Sudhir Srinivasa, Los Gatos, CA (US); Hongyuan Zhang, Fremont, CA (US); Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 52 days.

(21) Appl. No.: 17/229,340

(22) Filed: Apr. 13, 2021

(65) Prior Publication Data

US 2021/0321388 A1 Oct. 14, 2021

Related U.S. Application Data

(60) Provisional application No. 63/054,046, filed on Jul. 20, 2020, provisional application No. 63/051,423, filed on Jul. 14, 2020, provisional application No. 63/015,611, filed on Apr. 26, 2020, provisional application No. 63/008,950, filed on Apr. 13, 2020.

(51) Int. Cl.
*H04W 72/02* (2009.01)
*H04W 72/51* (2023.01)
*H04L 5/00* (2006.01)
*H04W 72/23* (2023.01)

(52) U.S. Cl.
CPC ........... *H04W 72/51* (2023.01); *H04L 5/0092* (2013.01); *H04W 72/23* (2023.01)

(58) Field of Classification Search
CPC .. H04W 72/048; H04W 72/042; H04L 5/0092
USPC .......................................................... 455/509
See application file for complete search history.

(56) References Cited

U.S. PATENT DOCUMENTS

| | | | | |
|---|---|---|---|---|
| 11,533,608 | B2 * | 12/2022 | Chu | H04L 1/0068 |
| 2021/0153210 | A1 * | 5/2021 | Li | H04L 5/0053 |
| 2021/0258806 | A1 * | 8/2021 | Stacey | H04W 24/02 |
| 2021/0289347 | A1 * | 9/2021 | Chu | H04L 1/0068 |
| 2022/0077982 | A1 * | 3/2022 | Zhang | H04L 5/0014 |

(Continued)

OTHER PUBLICATIONS

Po-Kai Huang et al. 320 MHz BSS Configuration. IEEE 802.11-20/0384r1, Intel (Feb. 6, 2020), 10 pgs.

(Continued)

*Primary Examiner* — Hai V Nguyen

(57) ABSTRACT

Communications may be effected in a communications environment involving a plurality channels having disparate bandwidth and channel center frequency indexes. Communications are effected using first communications type with a first channel bandwidth and first channel center frequency index. Communications are also effected via a second communications type using a separate set of fields indicating a second channel bandwidth and a second channel center frequency index, the second channel bandwidth being different than the first channel bandwidth and the second channel center frequency index being different than the first channel center frequency index. The channel center frequency index and bandwidth communicated in each communication may utilize separate subfields.

20 Claims, 2 Drawing Sheets

(56) References Cited

U.S. PATENT DOCUMENTS

2022/0110119 A1\* 4/2022 Song ................. H04W 72/0453
2022/0416943 A1\* 12/2022 Jang ..................... H04L 1/0069

OTHER PUBLICATIONS

Sanghyun Kim and Ji-Hoon Yun. Wider-Bandwidth Operation of IEEE 802.11 for Extremely High Throughput Challenges and Solutions for Flexible Puncturing. IEEE Access, vol. 8, 10.1109/ACCESS.2020.3040429 (Nov. 25, 2020), pp. 213840-213853.

\* cited by examiner

APPARATUS AND METHODS FOR COMMUNICATION WITH RESPECTIVE COMMUNICATION TYPES

OVERVIEW

Aspects of various embodiments are directed to methods and apparatuses involving communications between respective stations, as may be applicable to stations that operate utilizing different types of communications.

A variety of different types of wireless communications may be utilized in a common environment. For instance, as technology evolves, devices using existing (e.g., legacy) communications may communicate in an environment in which other devices using newer technology also communicate. In many instances, these devices need to communicate with one another, such that newer devices may need to be backwards-compatible with existing devices while also desirably communicating with other newer devices using a newer communication approach.

Communicating using different communication approaches can be challenging to implement. For instance, different channel bandwidths may be utilized for different types of communications. Different types of communications utilize different information for controlling communications. Where there are multiple generations of devices with different types of communications, ascertaining such communication types and sharing overlapping communication space can be challenging.

SUMMARY

Various example embodiments are directed to issues such as those addressed above and/or others which may become apparent from the following disclosure concerning communications in environments utilizing stations operating using disparate bandwidths and channel center frequencies.

In certain example embodiments, aspects of the present disclosure utilize respective communication types having disparate bandwidth and channel center frequencies. Such aspects may utilize sets of fields respectively including subfields indicating channel bandwidth and channel center frequency index.

In accordance with a particular embodiment, a method is carried out as follows, at a first station of a first communication type. A first communication including a first set of fields is received from an access point (AP), the first set of fields indicating a bandwidth and a channel center frequency (CCF) for stations of a second communication type. A second communication including a second set of fields is also received from the AP, the second set of fields indicating a bandwidth and a CCF for stations of the first communication type, the first set of fields and the second set of fields being disjoint. Channel bandwidth and a CCF are identified for respectively communicating with the stations of the first communication type and with the stations of the second communication type based on the first set of fields and on the second set of fields. In some implementations, one or more of the respective sets of fields includes a subfield indicating channel bandwidth and a separate subfield indicating channel center frequency index.

In a more specific example embodiment, a method is directed to communicating at a wireless station in a communications environment involving a plurality of channels having disparate bandwidth and channel center frequency indexes. The method involves communicating via a first communications type using a first channel bandwidth and first channel center frequency index. The method further involves communicating via a second communications type using a separate set of fields indicating a second channel bandwidth and a second channel center frequency index. The second channel bandwidth is different than the first channel bandwidth and the second channel center frequency index is different than the first channel center frequency index. In some implementations, the communications environment includes another wireless station that communicates exclusively via the first communications type. Such approaches may, for example, facilitate communications in which a type of stations (e.g., legacy) recognize a first channel bandwidth/center channel frequency, and another type of station (e.g., enhanced) recognize the first channel bandwidth/center channel frequency as well as enhanced channels of differing bandwidth/center channel frequency.

In another specific example embodiment, an apparatus includes communication circuitry and logic circuitry. The communication circuitry is configured to communicate a first communication including a first set of fields from an AP, the first set of fields indicating a bandwidth and a CCF for stations of a second communication type. The communication circuitry is also configured to communicate a second communication including a second set of fields from the AP, the second set of fields indicating a bandwidth and a CCF for stations of the first communication type, the first set of fields and the second set of fields being disjoint. The logic circuitry is configured to identify channel bandwidth and a CCF for respectively communicating with the stations of the first communication type and with the stations of the second communication type based on the first set of fields and on the second set of fields.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
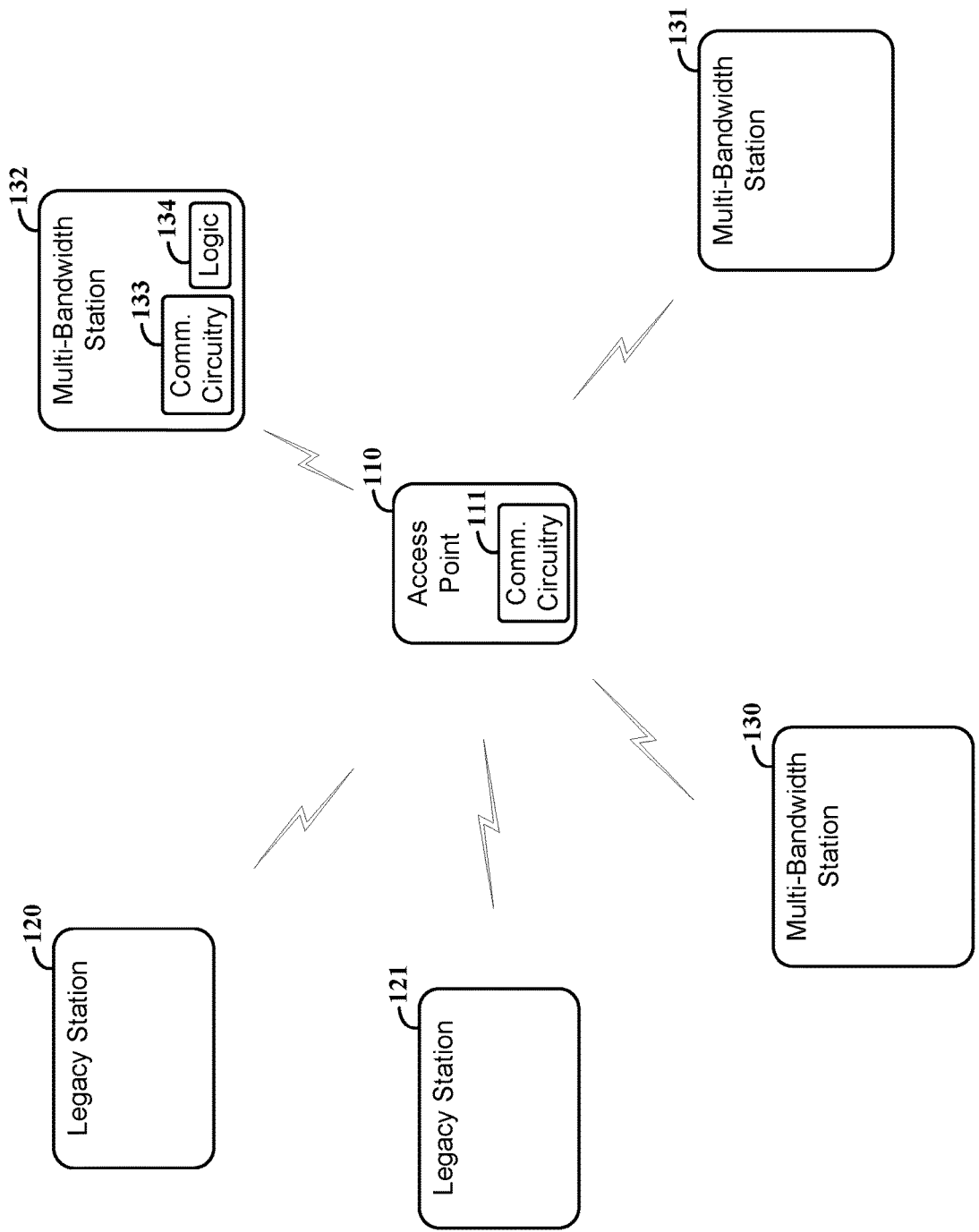
FIG. 1A shows apparatuses and a system for communication in accordance with one or more aspects of the disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving an environment in which different communication types respectively utilize disparate bandwidths and center channel frequencies. In certain implementations, aspects of the present disclosure have been shown to be beneficial when used in the context of facilitating communications involving a legacy type station (STA) as well as enhanced STAs. Such an approach may involve utilizing bandwidths and center channel frequencies amenable to use with each device, facilitating ongoing use of legacy type devices while also utilizing enhanced devices. In some embodiments, such an approach may involve identifying or otherwise using a separate set of fields indicating channel bandwidth and channel center frequency index for an enhanced device, which may be independent of legacy channel width and legacy channel center frequency (CCF) index. Legacy clients may effectively see only one bandwidth and CCF, whereas enhanced clients may effectively see the legacy and enhanced bandwidth and CCF. While not necessarily so limited, various aspects may be appreciated through the following discussion of non-limiting examples which use exemplary contexts.

Various mechanisms may be implemented for indicating a BSS (basic service set) bandwidth configuration from IEEE 802.11 EHT (extremely high throughput) STAs, in environments involving legacy STAs such as those one or more of HT (high throughput) STAs, VHT (very high throughput) STAs, as well as those involving high efficiency (HE). Such aspects may be implemented in accordance with the IEEE 802.11 standard, including releases up to and including IEEE 802.11-2020, which are incorporated herein by reference.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with a particular embodiment, the following method is carried out at a first station of a first communication type such as an EHT station. A first communication including a first set of fields is received from an AP, the first set of fields indicating a bandwidth and a CCF for stations of a second communication type, such as a VHT/HE station. A second communication including a second set of fields is also received from the AP, the second set of fields indicating a bandwidth and a CCF for stations of the first communication type. The second set of fields may be included in an operation element of a received management frame for communications with stations of the first communication type. The first set of fields and the second set of fields may be disjoint. Channel bandwidth and a CCF are identified for respectively communicating with the stations of the first communication type and with the stations of the second communication type based on the first and second sets of fields. In some implementations, one or more of the respective sets of fields includes a subfield indicating channel bandwidth and a separate subfield indicating channel center frequency index.

In the above and other embodiments herein, the first and second communications may be effected together, for instance as part of one message (e.g., from an AP to a STA). Furthermore, the terms "first" and "second" do not imply order, and are not indicative of the type of communication (first or second).

The second set of fields may include a channel width subfield and a set of Channel Center Frequency Segment (CCFS) subfields, with the channel width and set of CCFS subfields used to identify the channel bandwidth and CCF. The set of CCFS subfields may include a subfield for the first communication type that indicates a channel center frequency index of the communication bandwidth to be used, the channel bandwidth may be identified by a channel width subfield, and the channel center frequency index may be used for identifying the CCF for the given channel bandwidth. Such approaches may involve identifying:

a channel width subfield of 0 for 20 MHz bandwidth communications;

a channel width subfield of 1 for 40 MHz bandwidth communications;

a channel width subfield of 2 for 80 MHz bandwidth communications;

a channel width subfield of 3 for 160 MHz bandwidth communications; and a channel width subfield of 4 for 320 MHz bandwidth communications.

For instance, if the channel width is set to 0, the channel center frequency index may be used for identifying the channel center frequency of the first communications with 20 MHz bandwidth. If the channel width is set to 1, the channel center frequency index may be used for identifying the channel center frequency of the first communications with 40 MHz bandwidth. If the channel width is set to 2, the channel center frequency index may be used for identifying the channel center frequency of the first communications with 80 MHz bandwidth. If the channel width is set to 3, the channel center frequency index may be used for identifying the channel center frequency of the first communications with 160 MHz bandwidth. If the channel width is set to 4, the channel center frequency index may be used for identifying the channel center frequency of the first communications with 320 MHz bandwidth.

In some embodiments, the set of CCFS subfields includes first and second CCFS subfields for respective communications of the first communication type, the channel width and first and second CCFS subfields being used for identifying the channel bandwidth and the CCF. The first CCFS subfield may indicate a channel center frequency index for 20 MHz, 40 MHz, and 80 MHz bandwidth communications, a channel center frequency index of an 80 MHz channel segment that contains a primary channel for 160 MHz bandwidth communications, and a channel center frequency index of a 160 MHz channel segment that contains a primary channel for 320 MHz bandwidth communications. The second CCFS subfield may be set to zero for 20 MHz, 40 MHz and 80 MHz bandwidth communications, may indicate a channel center frequency index of a 160 MHz channel for 160 MHz bandwidth communications, and may indicate a channel center frequency index of a 320 MHz channel for 320 MHz bandwidth communications.

In another specific example embodiment, an apparatus includes communication circuitry and logic circuitry. The communication circuitry is configured to communicate a first communication including a first set of fields corresponding to an AP, the first set of fields indicating a bandwidth and a CCF for stations of a second communication type. The communication circuitry is also configured to communicate a second communication including a second set of fields corresponding to the AP, the second set of fields indicating a bandwidth and a CCF for stations of the first communication type, the first set of fields and the second set of fields being disjoint. The first and second communications may be communicated together as part of a single message (e.g., from an AP to a STA). The second set of fields may be included in an operation element of a received management frame for communications with stations of the first communication type. Further, the second set of fields may include a channel width subfield and a set of Channel Center Frequency Segment (CCFS) subfields, with the channel width and set of CCFS subfields used to identify the channel bandwidth and CCF as discussed above.

The logic circuitry is configured to identify channel bandwidth and a CCF for respectively communicating with the stations of the first communication type and with the stations of the second communication type based on the first set of fields and on the second set of fields. The communication circuitry and the logic circuitry may, for example, be part of a station of the first communication type. The communication circuitry and the logic circuitry may be part of a station of the first communication type. In certain implementations, the communication circuitry is located in the AP and the logic circuitry is located in a station.

The second set of fields may include a channel width subfield and a set of Channel Center Frequency Segment (CCFS) subfields, with the logic circuitry being configured to identify the channel bandwidth and a CCF for the stations of the first communication type using the channel width and set of CCFS subfields.

The logic circuitry may be configured to identify channel width subfields for communications with stations of the first communication type of: 0 for 20 MHz bandwidth communications, 1 for 40 MHz bandwidth communications, 2 for 80 MHz bandwidth communications, 3 for 160 MHz bandwidth communication, and 4 for 320 MHz bandwidth communications. Where the set of CCFS subfields includes a subfield for the first communication type that indicates a channel center frequency index of the communication bandwidth to be used, the logic circuitry is to identify the channel bandwidth and a CCF using the channel center frequency index.

Where the set of CCFS subfields includes first and second CCFS subfields for respective communications of the first communication type, the logic circuitry is to identify channel bandwidth and a CCF using the channel width and first and second CCFS subfields. This first CCFS subfield may indicate channel center frequency indexes for 20 MHz, 40 MHz, and 80 MHz bandwidth communications, of an 80 MHz channel segment that contains a primary channel for 160 MHz bandwidth communications, and of a 160 MHz channel segment that contains a primary channel for 320 MHz bandwidth communications. The second CCFS subfield may be set to zero for 20 MHz, 40 MHz and 80 MHz bandwidth communications, may indicate a channel center frequency index of a 160 MHz channel for 160 MHz bandwidth communications, and may indicate a channel center frequency index of a 320 MHz channel for 320 MHz bandwidth communications.

In a more particular embodiment, a BSS bandwidth configuration is indicated for IEEE 802.11 EHT STAB as follows. A first field (e.g., Channel Width subfield of an EHT Operation element) of an EHT AP (access point) indicates its EHT BSS bandwidth, wherein the indicated EHT BSS bandwidth can be a contiguous bandwidth such as 20 MHz, 40 MHz, 80 MHz, 160 MHz, and/or 320 MHz. A second field (e.g., EHT Channel Center Frequency Segment (EHT CCFS) subfield of an EHT Operation element) of the EHT AP indicates the channel center frequency index of the EHT BSS bandwidth. The EHT BSS bandwidth may be composed of a contiguous bandwidth. In this context, a channel center frequency index may be constructed with a different index allocated to channel with different bandwidth such that, if a channel index is given, the channel bandwidth of the channel can be found. For instance, a channel with a bandwidth of X may have one channel with bandwidth of 2X that occupies the channel with bandwidth of X. If a channel index of primary 20 MHz is given, a primary 40 MHz that includes the primary 20 MHz channel exists and can be found. Similarly, if a channel index of primary 40 MHz is given, a primary 80 MHz includes the primary 40 MHz channel and can be found.

As an operation example involving 6 GHz channels, bandwidth identification can be carried out as follows. If the channel index is one of $\{1, 5, 9, \ldots, 89, 93, 97\}$, the channel has 20 MHz bandwidth. If the channel index is one of $\{3, 11, 19, \ldots, 75, 83, 91\}$, the channel has 40 MHz bandwidth. If the channel index is one of $\{7, 23, 39, 55, 71, 87\}$, the channel has 80 MHz bandwidth. If the channel index is one of $\{15, 47, 79\}$, the channel has 160 MHz bandwidth.

Continuing with this operation example, higher bandwidth channel index identification may be carried out as follows. If the channel index of a primary 20 MHz (P20) is 1, the channel index of a P40 is 3, the channel index of P80 is 7, and the channel index of P160 is 15. If the channel index of P20 is 73, the channel index of P40 is 75, the channel index of P80 is 71, and the channel index of P160 is 79. As noted herein, the letter "P" as used with bandwidths such as 20 MHz and 40 MHz may be denoted as the primary bandwidth, for instance such that "P20" "P40" respectively refer to primary bandwidths of 20 MHz and 40 MHz.

Various approaches may be implemented if a first field (X) of an EHT AP indicates a channel center frequency index of a frequency segment, and a second field of the EHT AP indicates a channel number of a primary channel (P) whose bandwidth is 20 MHz. If the BSS of the EHT AP is on a 6 GHz band, the following may apply:

If X=floor(P/8)*8+3, the frequency segment is a 40 MHz channel.

If X=floor(P/16)*16+7, the frequency segment is a 80 MHz channel.

If X=floor(P/32)*32+15, the frequency segment is a 160 MHz channel.

If the BSS of the EHT AP is on 5 GHz band:

If X=floor((P−2)/8)*8+6, +mod(P, 2) the frequency segment is a 40 MHz channel.

If X=floor((P−2)/16)*16+10+mod(P, 2), the frequency segment is a 80 MHz channel.

If X=floor((P−2)/32)*32+18+mod(P, 2), the frequency segment is a 160 MHz channel.

Certain approaches are implemented when a first field (X) of an EHT AP indicates a channel center frequency index of a frequency segment, and a second field of the EHT AP indicates a channel number of a primary channel (P) whose bandwidth is 20 MHz. If the BSS of the EHT AP is on a 6 GHz band, the following may apply:

If X=floor(P/8)*8+3, the frequency segment is a 40 MHz channel.

If X=floor(P/16)*16+7, the frequency segment is a 80 MHz channel.

If X=floor(P/32)*32+15, the frequency segment is a 160 MHz channel.

If the BSS of the EHT AP is on 5 GHz band:

If X=floor((P−2)/8)*8+6, +mod(P, 2) the frequency segment is a 40 MHz channel.

If X=floor((P−2)/16)*16+10+mod(P, 2), the frequency segment is a 80 MHz channel.

If X=floor((P−2)/32)*32+18+mod(P, 2), the frequency segment is a 160 MHz channel.

In certain embodiments, a non-contiguous channel is disallowed. A first field (e.g., Channel Width subfield of an EHT Operation element) of an EHT AP indicates its EHT BSS bandwidth, wherein the indicated EHT BSS bandwidth can be limited to a contiguous bandwidth such as 20 MHz, 40 MHz, 80 MHz, 160 MHz, and/or 320 MHz. A second field (e.g., an EHT Channel Center Frequency Segment (EHT CCFS) subfield of EHT Operation element) of the EHT AP indicates the channel center frequency index of the EHT BSS bandwidth. The EHT BSS bandwidth may be limited to a contiguous bandwidth.

Another embodiment in which a non-contiguous channel is disallowed is carried out as follows. A first field (e.g., Channel Width subfield of EHT Operation element) of an EHT AP indicates its EHT BSS bandwidth, wherein the indicated EHT BSS bandwidth can be a contiguous bandwidth only such as 20 MHz, 40 MHz, 80 MHz, 160 MHz, and/or 320 MHz. A second field (e.g., Primary Channel field of HT/HE/EHT Operation element) of the EHT AP indicates the channel number* of the primary channel. If the first field indicates that the EHT BSS bandwidth is 320 MHz and if there is more than one 320 MHz channel mapped to the channel number of the primary channel, the EHT AP further indicates first information on mapping between the primary channel and the channel center frequency index or the channel number of the 320 MHz EHT BSS bandwidth.

In a further embodiment, if the first field indicates that the EHT BSS bandwidth is less than or equal to 160 MHz, one channel number with the channel bandwidth is indicated in the first field mapped to the channel number of the primary channel indicated in the second field, and an EHT non-AP STA identifies the channel center frequency index or the channel number of the EHT BSS bandwidth based on the first field and the second field. In another embodiment in which the first field indicates that the EHT BSS bandwidth is 320 MHz, two possible channel numbers of the 320 MHz bandwidth may be mapped to the channel number of the primary channel indicated in the second field, wherein the first information identifies which channel number of the 320 MHz bandwidth is mapped to the primary channel. Therefore, an EHT non-AP STA identifies the channel center frequency index or the channel number of the 320 MHz EHT BSS bandwidth based on the first field, the second field, and the first information.

The first field may further indicate the first information. If the operating channel of the EHT BSS is on a channel in which there is one mapping between the primary channel and the BSS bandwidth, the first information may be set to a first state. The first state may be a state that indicates a lower channel number of 320 MHz channel that can be mapped to the channel number of the primary channel. The first state may be a state that indicates a higher channel number of 320 MHz channel that can be mapped to the channel number of the primary channel. The first field may further include a state indicating 240 MHz.

In some implementations in which the first field indicates that the EHT BSS bandwidth is 240 MHz, more than one possible channel number of the 240 MHz bandwidth may be mapped to the channel number of the primary channel indicated in the second field. The first information may identify which channel number of the 240 MHz bandwidth is mapped to the primary channel. Therefore, an EHT non-AP STA identifies the channel center frequency index or the channel number of the 240 MHz EHT BSS bandwidth based on the first field, the second field, and the first information.

In another embodiment, the first field comprises the following states: 20 MHz, 40 MHz, 80 MHz, 160 MHz, 320 MHz—a first possible channel number, and 320 MHz—a second possible channel number. For 320 MHz, the first possible channel number may be a 320 MHz channel with the lower channel center frequency index, and 320 MHz with the second possible channel number is a 320 MHz channel with the higher channel center frequency index. If the first field indicates that the EHT BSS bandwidth is 320 MHz, the EHT Operation Element of the EHT AP may a third field that indicates the first information. The third field may be set to a predetermined state if the first field indicates that the EHT BSS bandwidth is less than 320 MHz. This predetermined state may be 0, and/or may be different from any state that indicates any of 320 MHz channel that is mapped to the primary channel. The third field may be set to a predetermined state, for instance if one 320 MHz channel bandwidth is mapped to the channel number indicated by the second field (and the predetermined state may be 0 and/or different from any state that indicates any of 320 MHz channel that is mapped to the primary channel).

Various other approaches may be implemented. If the EHT AP operates with channel puncturing, the EHT BSS bandwidth may indicate the total bandwidth that includes a set of subchannels that are punctured. The EHT AP may further indicate the HE BSS bandwidth, wherein the HE BSS bandwidth is a subset of the EHT BSS bandwidth, and wherein the HE BSS bandwidth is limited to a contiguous bandwidth. The EHT AP may not indicate the HE BSS bandwidth of 80 MHz+80 MHz. The first field may further include a state indicating 240 MHz. The EHT AP may further indicate a HE BSS bandwidth, wherein the HE BSS bandwidth is 80 MHz+80 MHz, and the EHT BSS bandwidth is set to 80 MHz band that is identical to the primary 80 MHz band of the HE BSS bandwidth or the secondary 80 MHz band of the HE BSS bandwidth.

In one embodiment, a second EHT AP that is affiliated with a same AP MLD (multi-link device) with the EHT AP indicates the EHT BSS bandwidth of the second EHT AP to be 80 MHz and the HE BSS bandwidth of the second EHT AP to be 80 MHz+80 MHz, with the HE BSS bandwidth of the second EHT AP and the HE BSS bandwidth of the EHT AP being identical, and the combination of the EHT BSS bandwidth of the second EHT AP and the EHT BSS bandwidth of the EHT AP equals the HE BSS bandwidth the EHT AP. The EHT AP may further indicate a HE BSS bandwidth, in which the HE BSS bandwidth is 80 MHz+80 MHz, and the EHT BSS bandwidth is set to equal to or wider than 80 MHz band that is identical to the primary 80 MHz band of the HE BSS bandwidth or the secondary 80 MHz band of the HE BSS bandwidth.

In another example, a second EHT AP that is affiliated with a same AP MLD with the EHT AP indicates the EHT BSS bandwidth of the second EHT AP to be equal to or wider than 80 MHz and the HE BSS bandwidth of the second EHT AP to be 80 MHz+80 MHz, wherein the HE BSS bandwidth of the second EHT AP and the HE BSS bandwidth of the EHT AP are identical, and wherein the combination of the EHT BSS bandwidth of the second EHT AP and the EHT BSS bandwidth of the EHT AP includes the HE BSS bandwidth the EHT AP.

An operation example is as follows. An EHT Operation element includes a Channel Width field which indicates the EHT BSS bandwidth, wherein the EHT BSS bandwidth can be one of the following values: 20 MHz, 40 MHz, 80 MHz, 160 MHz, and 320 MHz. An EHT Operation element includes an EHT CCFS field which indicates the channel center frequency index of the indicated EHT BSS bandwidth.

In another operation example, an EHT Operation element includes a Channel Width field which indicates the EHT BSS bandwidth, wherein the EHT BSS bandwidth can be one of the following values: 20 MHz, 40 MHz, 80 MHz, 160 MHz, 240 MHz, and 320 MHz. An EHT Operation element includes an EHT CCFS field which indicates the channel center frequency index of the indicated EHT BSS bandwidth.

Certain embodiments involve BSS bandwidth identification for 320/160+160 MHz. Various examples may characterize embodiments in which non-contiguous communications are not allowed. However, various implementations involve allowing non-contiguous communications, for instance as separate or in connection therewith.

In one example, a field (e.g., Channel Width subfield of EHT Operation element) of an EHT AP indicates its supported BSS bandwidth, wherein one state of the first field indicates 320 MHz or 160+160 MHz (320/160+160 MHz). If the state of the first field is set to 320/160+160 MHz, a second field (e.g., EHT_CCFS0) of the EHT AP indicates the channel center frequency index of the 160 MHz channel segment that contains the primary channel for 320 MHz BSS bandwidth, and the channel center frequency index for the primary 160 MHz channel for 160+160 MHz BSS bandwidth. If the state of the first field is set to 320/160+160 MHz, a third field (e.g., EHT_CCFS1) of the EHT AP indicates the channel center frequency index of the 320 MHz channel for 320 MHz BSS bandwidth; and the channel center frequency index of the secondary 160 MHz channel for 160+160 MHz BSS bandwidth. If the state of the first field is set to 320/160+160 MHz, an EHT STA identifies the location and the size of the EHT AP's supported BSS bandwidth as:

If |EHT_CCFS0−EHT_CCFS1|=16, the BSS bandwidth is 320 MHz and EHT_CCFS1 indicates the channel center frequency of the 320 MHz channel; and If |EHT_CCFS0−EHT_CCFS1|>32, the BSS bandwidth is 160+160 MHz and EHT_CCFS0/EHT_CCFS1 indicate the channel center frequency of primary/secondary 160 MHz channel, respectively.

In a particular example, a field (e.g., Channel Width subfield of EHT Operation element) of an EHT AP indicates its supported BSS bandwidth, wherein one state of the first field indicates 320 MHz. If the state of the first field is set to 320, a second field (e.g., EHT_CCFS0) of the EHT AP indicates the channel center frequency index of the 160 MHz channel segment that contains the primary channel for 320 MHz BSS bandwidth. If the state of the first field is set to 320, a third field (e.g., EHT_CCFS1) of the EHT AP indicates the channel center frequency index of the 320 MHz channel for 320 MHz BSS bandwidth. If the state of the first field is set to 320, an EHT STA may identify the location and the size of the EHT AP's supported BSS bandwidth as: If |EHT_CCFS0−EHT_CCFS1|=16, the BSS bandwidth is 320 MHz and EHT_CCFS1 indicates the channel center frequency of the 320 MHz channel.

Certain embodiments involve BSS bandwidth identification for 160/80+80 MHz. A first field (e.g., Channel Width subfield of EHT Operation element) of an EHT AP indicates its supported BSS bandwidth, wherein one state of the first field indicates less than 320 MHz (20/40/80/160/80+80 MHz). If the state of the first field is set to 20/40/80/160/80+80 MHz, a second field (EHT_CCFS0) of the EHT AP indicates the channel center frequency index of the 80 MHz channel segment that contains the primary channel for 160 MHz BSS bandwidth, and the channel center frequency index for the primary 80 MHz channel for 80+80 MHz BSS bandwidth.

If the state of the first field is set to 20/40/80/160/80+80 MHz, a third field (EHT_CCFS1) of the EHT AP is set to 0 for 20/40/80 MHz BSS bandwidth (or reserved), and indicates the channel center frequency index of the 160 MHz channel for 160 MHz BSS bandwidth and the channel center frequency index of the secondary 80 MHz channel for 80+80 MHz BSS bandwidth. If the state of the first field is set to 20/40/80/160/80+80 MHz, an EHT STA identifies the location and the size of the EHT AP's supported BSS bandwidth as follows:

If |EHT_CCFS0−EHT_CCFS1|=8, the BSS bandwidth is 160 MHz and EHT_CCFS1 indicates the channel center frequency of the 160 MHz channel; and If |EHT_CCFS0−EHT_CCFS1|>16, the BSS bandwidth is 80+80 MHz and EHT_CCFS0/EHT_CCFS1 indicate the channel center frequency of primary/secondary 80 MHz channel, respectively.

Certain embodiments involve BSS bandwidth identification for 240/80+160/160+80 MHz. A first field (e.g., Channel Width subfield of an EHT Operation element) of an EHT AP indicates its supported BSS bandwidth, wherein one state of the first field indicates 240 MHz or 80+160 MHz or 160+80 MHz (240/80+160/160+80 MHz). If the state of the first field is set to 240/80+160/160+80 MHz, a second field (EHT_CCFS0) of the EHT AP indicates the channel center frequency index of the P segment. If the state of the first field is set to 240/80+160/160+80 MHz, a third field (EHT_CCFS1) of the EHT AP indicates the channel center frequency index of the 240 MHz channel for 240 MHz BSS bandwidth, and the channel center frequency index of an NP segment for 80+160 MHz or 160+80 MHz BSS bandwidth. If the EHT AP's supported BSS bandwidth is 80+160 MHz or 160+80 MHz, a fourth field may indicate if the P segment is P80 or P160. If the state of the first field is set to 240/80+160/160+80 MHz, an EHT STA identifies the location and the size of the EHT AP's supported BSS bandwidth as:

If |EHT_CCFS0−EHT_CCFS1|=16 or 8, the BSS bandwidth is 240 MHz and EHT CCF indicates the channel center frequency of the 240 MHz channel;

If |EHT_CCFS0−EHT_CCFS1|>20 and the fourth field indicates P80, the BSS bandwidth is 80+160 MHz and EHT_CCFS0/EHT_CCFS1 indicate the channel center frequency of primary 80 MHz and secondary 160 MHz channel, respectively; and If |EHT_CCFS0−EHT_CCFS1|>20 and the fourth field indicates P160, the BSS bandwidth is 160+80 MHz and EHT_CCFS0/EHT_CCFS1 indicate the channel center frequency of primary 160 MHz and secondary 80 MHz channel, respectively.

In certain embodiments, a first field (e.g., Channel Width subfield of EHT Operation element) of an EHT AP indicates its supported BSS bandwidth, wherein one state of the first field indicates 240 MHz or 80+160 MHz or 160+80 MHz (240/80+160/160+80 MHz). If the state of the first field is set to 240/80+160/160+80 MHz, a second field (EHT_CCFS0) of the EHT AP indicates the channel center frequency index of the P segment. If the state of the first field is set to 240/80+160/160+80 MHz, a third field (EHT_CCFS1) of the EHT AP indicates the channel center frequency index of the NP segment. If the EHT AP's supported BSS bandwidth is 80+160 MHz or 160+80 MHz, a fourth field indicates if the P segment is P80 or P160. If the state of the first field is set to 240/80+160/160+80 MHz, an EHT STA identifies the location and the size of the EHT AP's supported BSS bandwidth as:

If |EHT_CCFS0−EHT_CCFS1|=24, the BSS bandwidth is 240 MHz;

If |EHT_CCFS0−EHT_CCFS1|>24 and the fourth field indicates P80, the BSS bandwidth is 80+160 MHz and EHT_CCFS0/EHT_CCFS1 indicate the channel center frequency of primary 80 MHz and secondary 160 MHz channel, respectively; and If |EHT_CCFS0−EHT_CCFS1|>24 and the fourth field indicates P160, the BSS bandwidth is 160+80 MHz and EHT_CCFS0/EHT_CCFS1 indicate the channel center frequency of primary 160 MHz and secondary 80 MHz channel, respectively.

Various embodiments are directed to 802.11 contribution cases. In a first case, two CCFSs are defined in an in EHT Operation element as EHT_CCFS0/1. EHT_CCFS0 is an extension of CCFS0 in VHT/HE. For 20/40/80 MHz BSS BW (bandwidth), this indicates the channel center frequency index (CCFI) for the channel. For 160 MHz BSS BW, this indicates the CCFI of the 80 MHz channel segment that contains the primary channel. For 320 MHz BSS BW, this indicates the CCFI of the 160 MHz channel segment that contains the primary channel. EHT_CCFS1 may be an extension of CCFS1/2 in VHT/HE. For 20/40/80 MHz BSS BW, this may be set to 0. For 160/320 MHz BSS BW, this indicates the CCFI of the channel.

In one embodiment, the BSS BW can be set to 80+80 MHz or 160+160 MHz. For 80+80 MHz BSS BW, the EHT_CCFS0 indicates the CCFI for the primary 80 MHz channel and the EHT CCFS1 indicates the CCFI for the secondary 80 MHz channel. For 160+160 MHz BSS BW, the EHT_CCFS0 indicates the CCFI for the primary 160 MHz channel and the EHT_CCFS1 indicates the CCFI of the secondary 160 MHz channel. If the BSS bandwidth for VHT STAs/HE STAs is indicated to be 160/80+80 MHz and the first field indicates either 160 MHz or 80+80 MHz, the BSS bandwidth and center frequency location indicated for VHT/HE STAs is applied for the BSS bandwidth and center frequency location for EHT STAs.

Where two CCFSs are defined in an EHT Operation element EHT_CCFS0/1 as noted above, bandwidth for an EHT STA can be indicated as:
  Channel Width=0: 20/40 MHz (CCF from EHT_CCFS0);
  Channel Width=1: 80 MHz (CCF from EHT_CCFS0);
  Channel Width=2:
    160 MHz: EHT_CCFS1>0 & |EHT_CCFS1−EHT_CCFS0|=8; and
    80+80 MHz: EHT_CCFS1>0 & |EHT_CCFS1−EHT_CCFS0|>16; and
  Channel Width=3:
    320 MHz: EHT_CCFS1>0 & |EHT_CCFS1−EHT_CCFS0|=16; and
    160+160 MHz: EHT_CCFS1>0 & |EHT_CCFS1−EHT_CCFS0|>32.

In another embodiment, where two CCFSs are defined in an EHT Operation element EHT_CCFS0/1 as noted above, bandwidth for an EHT STA can be indicated as:
  Channel Width=0: 20 MHz (CCF from EHT_CCFS0);
  Channel Width=1: 40 MHz (CCF from EHT_CCFS0);
  Channel Width=2: 80 MHz (CCF from EHT_CCFS0);
  Channel Width=3: 160 MHz: EHT_CCFS1>0 & |EHT_CCFS1−EHT_CCFS0|=8 (CCF from EHT_CCFS1); and
  Channel Width=4: 320 MHz: EHT_CCFS1>0 & |EHT_CCFS1−EHT_CCFS0|=16 (CCF from EHT_CCFS1).

In another embodiment where one CCFS is defined in an EHT Operation element EHT_CCFS as noted above, bandwidth for an EHT STA can be indicated as:
  Channel Width=0: 20 MHz (CCF from EHT_CCFS);
  Channel Width=1: 40 MHz (CCF from EHT_CCFS);
  Channel Width=2: 80 MHz (CCF from EHT_CCFS);
  Channel Width=3: 160 MHz (CCF from EHT_CCFS); and
  Channel Width=4: 320 MHz (CCF from EHT_CCFS).

Various embodiments are characterized in the underlying provisional applications to which priority is claimed, which are noted as follows and fully incorporated herein by reference:

U.S. Provisional Patent Application No. 63/008,950, filed on 13 Apr. 2020;

U.S. Provisional Patent Application No. 63/015,611 filed on 26 Apr. 2020;

U.S. Provisional Patent Application No. 63/051,423 filed on 14 Jul. 2020; and

U.S. Provisional Patent Application No. 63/054,046 filed on 20 Jul. 2020.

For example, referring to U.S. Provisional Patent Application No. 63/054,046, various embodiments may be directed toward aspects therein including those characterized as "Proposal 0a" for disallowing a non-contiguous channel. Other embodiments may be directed to aspects directed to center channel frequency index and/or bandwidth identification as noted in various options A1-A4, B1-B5, C1-C3 and D1-D4, some of which are further characterized herein. Such approaches may be carried out for utilizing a separate set of fields indicating channel bandwidth and channel center frequency index, which may be independent of channel width and channel center frequency index for other (e.g., legacy) communications. For instance, various approaches to indicating such aspects may be carried out in an environment having stations that operate using different bandwidth and CCF in which a legacy client sees only one and an enhanced new client sees legacy and new channels. Such an environment may utilize stations and clients as noted, for example, in FIG. 1A and discussed below.

Turning now to the figures, FIG. 1A shows apparatuses and a system for communication in accordance with one or more aspects of the disclosure. An AP 110 is configured to communicate with a plurality of stations, including legacy stations 120 and 121 utilizing legacy communications, and multi-bandwidth stations 130, 131 and 132 utilizing enhanced communications. Each respective station and the AP may include communication and logic circuitry, with the AP shown as including communication circuitry 111 and multi-bandwidth station 132 depicted with communication circuitry 133 and logic circuitry 134.

In a particular embodiment, the communication circuitry 133 receives respective communications from the AP 110, including a communication having a set of fields indicating a bandwidth and a CCF for stations of a the legacy communication type, and another communication including another set of fields indicating a bandwidth and a CCF for stations of the enhanced communication type, the respective sets of fields being disjoint. The logic circuitry 134 may identify channel bandwidth and a CCF for respectively communicating using the legacy and enhanced communication types based on the sets of fields.

Figure 1B:
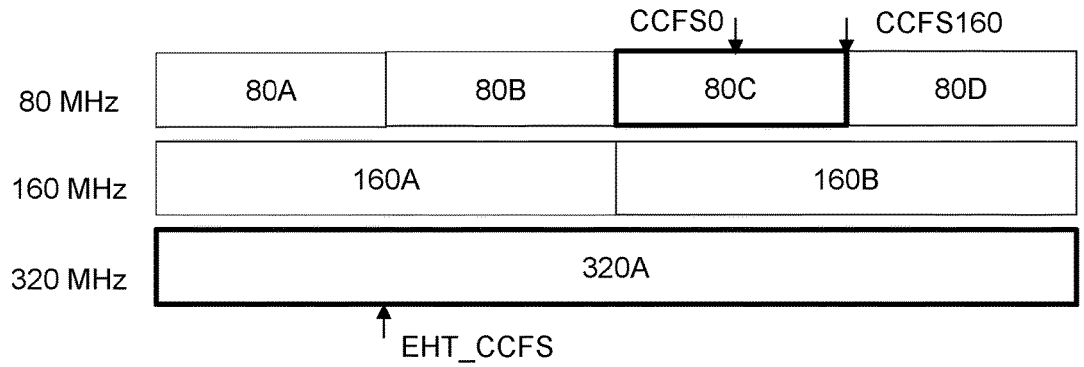
FIG. 1B shows an operation example, which may be implemented in accordance with FIG. 1A and/or other aspects of the disclosure.

FIG. 1B shows an operation example, which may be implemented in accordance with FIG. 1A and/or other aspects of the disclosure. Communications are shown for 80 MHz, 160 MHz and 320 MHz. BSS bandwidth for VHT/HE STAs is 80 MHz, and BSS bandwidth for EHT STA is 320 MHz. Based on CCFS0, CCFS160 can be identified (CCFS160=channel center frequency of 160B). EHT_CCFS indicates the channel center frequency of 160 A. As |CCFS160−EHT_CCFS|=32, the BSS bandwidth may be identified to be 320 MHz.

Figure 1C:
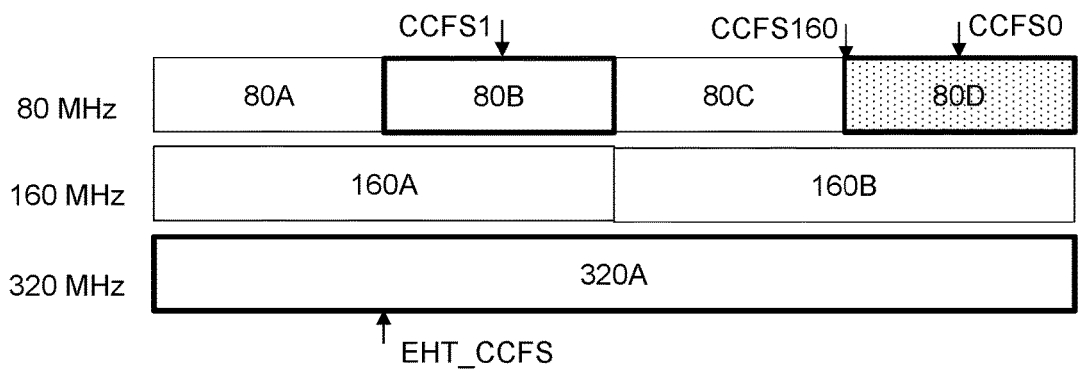
FIG. 1C shows another operation example, which may be implemented in accordance with FIG. 1A and/or other aspects of the disclosure.

FIG. 1C shows other operation example, which may be implemented in accordance with FIG. 1A and/or other aspects of the disclosure. The BSS bandwidth for VHT/HE STAs is 80+80 MHz, and the BSS bandwidth for EHT STA is 320 MHz. Based on CCFS0, CCFS160 may be identified (CCFS160=channel center frequency of 160B). EHT_CCFS indicates the channel center frequency of 160 A. As |CCFS160−EHT_CCFS|=32, the BSS bandwidth may be identified to be 320 MHz.

Figure 1D:
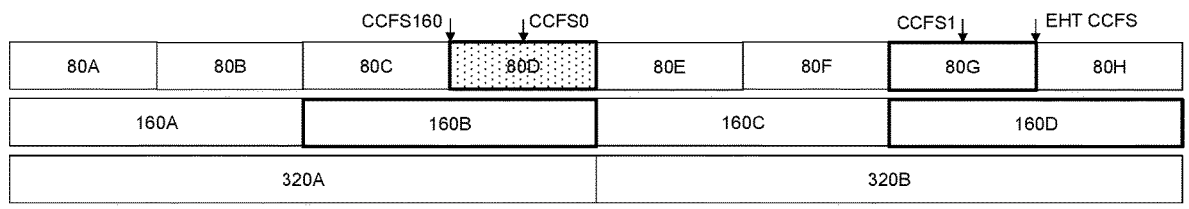
FIG. 1D shows yet another operation example, which may be implemented in accordance with FIG. 1A and/or other aspects of the disclosure.

FIG. 1D shows yet another operation example, which may be implemented in accordance with FIG. 1A and/or other aspects of the disclosure. BSS bandwidth for VHT/HE STAs is 80+80 MHz, and BSS bandwidth for EHT STA is 160+160 MHz. Based on CCFS0, CCFS160 can be identified (CCFS160=channel center frequency of 160B). EHT_CCFS indicates the channel center frequency of 160 A. As |CCFS160−EHT_CCFS|=64>32, the BSS bandwidth may be identified to be 160+160 MHz.

As examples, the Specification describes and/or illustrates aspects useful for implementing the claimed disclosure by way of various circuits or circuitry which may be illustrated as or using terms such as blocks, modules, device, system, unit, controller, station, access point, multi-bandwidth station, and/or other circuit-type depictions (e.g., reference numerals 110, 120, 121 and 130-132 of FIG. 1A depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing identification of channel bandwidth and center channel frequency, and in another example, the logic circuitry may carry out a process or method by performing these same activities/operations. Yet other processes or methods in this context would be recognized in connection with the functions/activities characterized in FIGS. 1B-1D.

In certain of the above-discussed embodiments, one or more modules may be discrete logic circuits or programmable logic circuits configured and arranged for implementing these operations/activities, as may be carried out in the approaches shown in FIGS. 1A-1D. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with the various examples herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first" type of communication and/or station/device, and a "second" type of communication and/or station/device, etc., where the structure might be replaced with terms such as "circuit", "circuitry" and others, the adjectives "first" and "second" are not used to connote any description of the structure/communication type or to provide any substantive meaning; rather, such adjectives are merely used for English-language antecedence to differentiate one such similarly-named structure from another similarly-named structure (e.g., "first circuit configured to identify . . . " is interpreted as "circuit configured to identify . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures herein and/or in the underlying provisional applications referenced above may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:
1. A method comprising:
receiving, at a first station of a first communication type, wherein the first communication type is 802.11 extremely high throughput (EHT),
a first communication including a first set of fields from an access point (AP), the first set of fields indicating a bandwidth and a channel center frequency (CCF) for stations of a second communication type, wherein the second communication type is 802.11 High Efficiency (HE), and
a second communication including a second set of fields from the AP, the second set of fields indicating a bandwidth and a CCF for stations of the first communication type, the first set of fields and the second set of fields being disjoint; and
identifying, by the first station, channel bandwidth and a CCF for respectively communicating with the stations of the first communication type and with the stations of the second communication type based on the first set of fields and on the second set of fields, wherein when the bandwidth of the second communication type indicated in the first set of fields is equal to 160 MHz, the CCF and bandwidth indicated in the first set of fields is used for the bandwidth and the CCF of the first communication type.

2. The method of claim 1, wherein:
the second set of fields includes a channel width subfield and a set of Channel Center Frequency Segment (CCFS) subfields; and
identifying channel bandwidth and a CCF for the stations of the first communication type includes using the channel width and set of CCFS subfields.

3. The method of claim 2, further comprising, for communications with stations of the first communication type:
identifying a channel width subfield of 0 for 20 MHz bandwidth communications;
identifying a channel width subfield of 1 for 40 MHz bandwidth communications;
identifying a channel width subfield of 2 for 80 MHz bandwidth communications;
identifying a channel width subfield of 3 for 160 MHz bandwidth communications; and
identifying a channel width subfield of 4 for 320 MHz bandwidth communications.

4. The method of claim 2, wherein:
the set of CCFS subfields includes subfield for the first communication type that indicates a channel center frequency index of the communication bandwidth to be used; and
identifying the channel bandwidth and a CCF for the stations of the first communication type includes using the channel center frequency index.

5. The method of claim 2, wherein:
the set of CCFS subfields includes first and second CCFS subfields for respective communications of the first communication type; and
identifying channel bandwidth and a CCF for the stations of the first communication type includes using the channel width and first and second CCFS subfields.

6. The method of claim 5, wherein the first CCFS subfield indicates:
a channel center frequency index for 20 MHz, 40 MHz, and 80 MHz bandwidth communications;
a channel center frequency index of an 80 MHz channel segment that contains a primary channel for 160 MHz bandwidth communications; and
a channel center frequency index of a 160 MHz channel segment that contains a primary channel for 320 MHz bandwidth communications.

7. The method of claim 5, wherein:
the second CCFS subfield is set to zero for 20 MHz, 40 MHz and 80 MHz bandwidth communications;
the second CCFS subfield indicates a channel center frequency index of a 160 MHz channel for 160 MHz bandwidth communications; and
the second CCFS subfield indicates a channel center frequency index of a 320 MHz channel for 320 MHz bandwidth communications.

8. The method of claim 1, wherein the second set of fields are included in an operation element of a received management frame for communications with stations of the first communication type.

9. The method of claim 1, wherein the first communication type includes communications under EHT BSS and the second communication type includes communications under HE BSS.

10. The method of claim 1, further including transmitting, from the AP, the first and second communication in a common message.

11. The method of claim 1, wherein the first set of fields indicate a bandwidth and first and second CCFS subfields for the second communication type.

12. An apparatus comprising:
communication circuitry to communicate:
a first communication including a first set of fields from an access point (AP), the first set of fields indicating a bandwidth and a channel center frequency (CCF) for stations of a second communication type, wherein the second communication type is 802.11 High Efficiency (HE), and
a second communication including a second set of fields from the AP, the second set of fields indicating a bandwidth and a CCF for stations of a first communication type, wherein the first communication type is 802.11 extremely high throughput (EHT), the first set of fields and the second set of fields being disjoint; and
logic circuitry to identify channel bandwidth and a CCF for respectively communicating with the stations of the first communication type and with the stations of the second communication type based on the first set of fields and on the second set of fields, when the bandwidth of the second communication type indicated in the first set of fields is equal to 160 MHz, the CCF and bandwidth indicated in the first set of fields is used for the bandwidth and the CCF of the first communication type.

13. The apparatus of claim 12, wherein:
the second set of fields include a channel width subfield and a set of Channel Center Frequency Segment (CCFS) subfields; and
the logic circuitry is to identify the channel bandwidth and a CCF for the stations of the first communication type using the channel width and set of CCFS subfields.

14. The apparatus of claim 13, wherein the logic circuitry is to, for communications with stations of the first communication type:
identify a channel width subfield of 0 for 20 MHz bandwidth communications;
identify a channel width subfield of 1 for 40 MHz bandwidth communications;
identify a channel width subfield of 2 for 80 MHz bandwidth communications;
identify a channel width subfield of 3 for 160 MHz bandwidth communications; and
identify a channel width subfield of 4 for 320 MHz bandwidth communications.

15. The apparatus of claim 13, wherein:
the set of CCFS subfields includes subfield for the first communication type that indicates a channel center frequency index of the communication bandwidth to be used; and
the logic circuitry is to identify the channel bandwidth and a CCF for the stations of the first communication type includes using the channel center frequency index.

16. The apparatus of claim 13, wherein:
the set of CCFS subfields includes first and second CCFS subfields for respective communications of the first communication type; and
the logic circuitry is to identify channel bandwidth and a CCF for the stations of the first communication type includes using the channel width and first and second CCFS subfields.

17. The apparatus of claim 16, wherein the first CCFS subfield indicates:
a channel center frequency index for 20 MHz, 40 MHz, and 80 MHz bandwidth communications;

a channel center frequency index of an 80 MHz channel segment that contains a primary channel for 160 MHz bandwidth communications; and a channel center frequency index of a 160 MHz channel segment that contains a primary channel for 320 MHz bandwidth communications.

18. The apparatus of claim 16, wherein:

the second CCFS subfield is set to zero for 20 MHz, 40 MHz and 80 MHz bandwidth communications;

the second CCFS subfield indicates a channel center frequency index of a 160 MHz channel for 160 MHz bandwidth communications; and the second CCFS subfield indicates a channel center frequency index of a 320 MHz channel for 320 MHz bandwidth communications.

19. The apparatus of claim 12, wherein the second set of fields are included in an operation element of a received management frame for communications with stations of the first communication type.

20. The apparatus of claim 12, wherein the communication circuitry and the logic circuitry are part of a station of the first communication type.

* * * * *